W. MAGROWITZ.
Spirit Meter.
No. 58,114.
Patented Sept. 18, 1866.
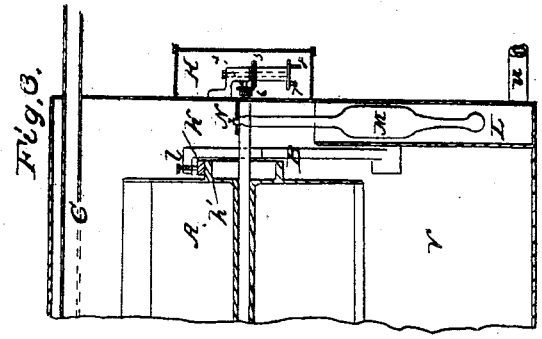
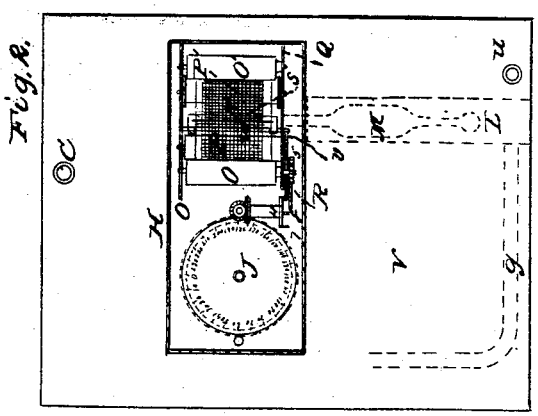
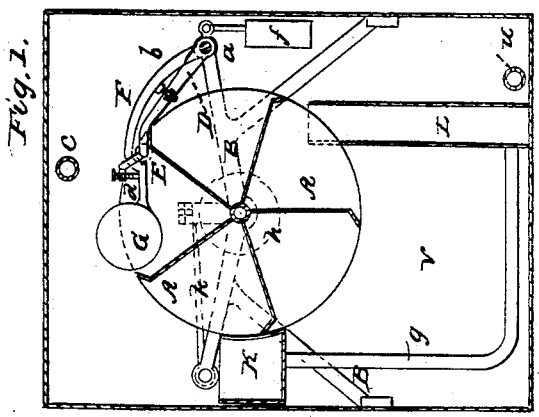
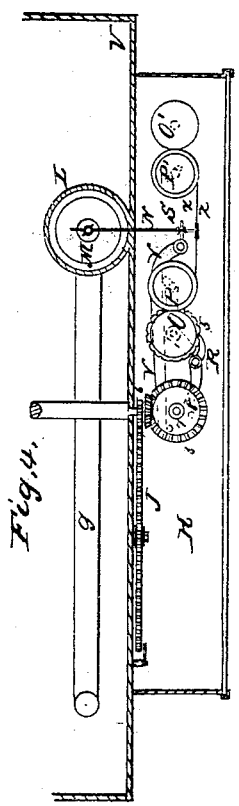
Witnesses:
E. W. Boyarder
D. Mosher
Inventor:
William Magrowitz
pr Henry C. Raider
His Attorney

United States Patent Office.

WM. MAGROWITZ, OF NEW YORK, N. Y., ASSIGNOR TO HIMSELF, WM. FREEDMAN, AND JAMES DAVIS.

IMPROVED SPIRIT-METER.

Specification forming part of Letters Patent No. 58,114, dated September 18, 1866.

*To all whom it may concern:*

Be it known that I, WILLIAM MAGROWITZ, of New York, in the county and State of New York, have invented a new and Improved Alcoholometer; and I do hereby declare that the following is a full, clear, and exact description of the construction and operation of the same, reference being had to the annexed drawings, making a part of this specification, and to the letters of reference marked thereon.

Figure I represents a cross-section, and Fig. II a front view, of the machine. Fig. III is a longitudinal section of one side of the machine, and Fig. IV shows a plan or top view of the recording mechanism on an enlarged scale.

Similar letters represent similar parts in all the figures.

This invention consists of a meter whereby alcohol or high-wines shall be measured in quantity as well as quality or strength, and for which purpose I construct a meter-wheel, A, arranged in a perfectly-tight box, V, and turning freely in suitable bearings B B. This wheel A is divided in cavities or chambers, (five, as represented in the drawings,) each cavity or chamber containing one gallon or more, according to the size of the machine. Above this wheel a pipe, C, is arranged, coming from the still and discharging into the top cell of the wheel A.

On one side, near the top of the wheel A, a shaft, $a$, is arranged, turning in suitable centers in the frames B. To this shaft levers D are attached, having at their other ends a roller, E, so arranged that, by said roller E resting against one of the partitions in the wheel A, said wheel will be held stationary.

F is a lever placed loosely upon the shaft $a$, having at its other end a float, G, projecting some little distance into one of the cavities of the wheel A. This lever F is acted upon by a set-screw, $b$, fast to a cross-bar connecting the levers D, and acting against the under side of the lever F, and likewise, by a set-screw, $d$, fast to another cross-bar connecting the levers D, and acting against the upper side of the lever F. By this arrangement the position of the lever F, and consequently of the float G, may be easily regulated, and is at the same time, in every position, firmly connected with the levers D, and consequently with the roller E.

When the top cavity of the wheel A has been filled, the float G will be lifted upward by the action of the fluid until the roller E comes clear of the partition, when the weight of the fluid will cause the wheel A to turn around until the next partition of the following chamber comes against the roller E to stop the further turning of the wheel A.

The levers D F, &c., may be balanced either by a suitable spring or by a weight, $f$, as shown in the drawings.

On one side of the wheel A a friction-pulley, $h$, is attached, acted upon by a friction-lever, $k$, regulated by means of the set-screw $l$, to regulate the motion of said wheel. The liquid empties itself during the turning of the wheel A into the box V, and then runs off through the pipe U at the bottom.

The shaft of the wheel A passes through the front of the box into another small box, H, fastened against the same, and is connected through a pinion, $b$, with an index-wheel, J, on which the number of the revolutions of said wheel A will be marked, and can easily be seen, and, as before described, each chamber of said wheel contains a fixed quantity—say one gallon—there will five gallons of liquid pass into and out of the box by each revolution of said wheel A, by which arrangement the quantity or number of gallons coming from the still will be easily measured and marked.

Instead of the index-wheel J, as above described, the shaft of this wheel A may be connected with a train of wheels in combination with suitable index-plates similar to that arranged on gas-meters.

Against one side of the wheel A a small box or chamber, K, is arranged close to the periphery of the wheel, but with sufficient clearance to allow said wheel to pass freely. This box is situated some little distance above the center of the wheel, and open at the top, so as to catch some part of the liquid which runs out of the chamber or cavity of the wheel A during the turning around of said wheel. That part of the liquid caught in this box K passes through a pipe, $g$, into a large pipe or cylinder, L, arranged near the front of the box, filling said pipe or cylinder, and then runs off at its top again into the wheel-box, from which it passes away with the other liquid through the pipe U. Into this pipe or cylinder a hydrometer, M, is placed, having at its upper end a needle, N, attached at right angles, or horizontally, and passing through a small opening in the front of the wheel-box V into the index-box H, to mark or indicate the weight or specific gravity of the liquid, in the manner hereinafter described.

On that end of the shaft of the wheel A which projects into the box H a wheel, 2, is arranged, meshing into the bevel-wheel 3. In the box H two rollers, O and O', are arranged, turning perpendicularly in suitable bearings in the frames Q Q, arranged in this box H. Between these rollers O and O', which I call "friction-rollers," two other rollers, P P', which I call the "paper-rollers," are arranged, turning in suitable slots in the frames Q, so constructed that, while the centers of said rollers P P' may move farther away from the centers of the friction-rollers O O', the outer periphery of said paper-rollers, or the paper which shall be wound upon said rollers and passing from one roller to the other, will always remain in one and the same fixed plane.

The axis of the roller O is connected with the axis of the roller P by means of springs, and in the same manner the axis of the roller O' is connected with the axis of the roller P', so that the periphery of the respective rollers will always be kept in contact with each other.

Around the roller P' a quantity of paper is wound, corresponding nearly to the quantity of liquid distilled and passed through the machine, and to the length of time the meter is required to run before being opened. The end of this paper from the roller P' is then passed between guide-plates $xx$ to the roller P, and fastened to the latter.

The periphery of the roller O is, as before mentioned, always in close contact with the periphery or circumference of the roller P, in consequence of which any motion communicated to this roller O will be communicated to the roller P at its circumference, in consequence of which the periphery of said roller P will always move at a certain fixed velocity independent of the diameter of said roller, according to a greater or smaller amount of paper on said roller. By this arrangement of communicating motion from the roller O to the roller P by the friction at their peripheries, the paper will be wound upon this roller P and unwound from the roller P', and pass, therefore, through the guide-plates $xx$ always at a regular and fixed speed. To increase the friction of the roller O the surface of the same may be made rough or grooved for that purpose. This required motion is given to the roller O by means of a pawl-lever, R, turning loosely on a fixed center, and acting upon the ratchet-wheel 5, fast to the axis of the roller O.

To the bevel-wheel 3 a flange-wheel, 4, is attached, provided with a pin, 8, acting against this pawl-lever R, giving thereby the required motion to the roller O. A suitable spring acting against the pawl-lever R is arranged to keep the same in its proper position.

Between the rollers P and P' a light frame, S, is arranged fast to an upright shaft, $w$, turning in suitable bearings in the frames Q. This frame S is provided with a slot or opening running nearly its whole length from top to bottom, through which the needle N, fastened to the top of the hydrometer M, passes freely. This needle is secured by small nuts at each side of the frame S, but arranged in such a manner as to allow a perfectly free motion upward or downward in the slot in said frame.

The guide-plates $xx$ have likewise slots corresponding with the slot in this frame S, and exactly opposite to the point of the needle N, said needle being made of such a length as to come nearly to the middle between these guide-plates $xx$, between which, as before mentioned, the sheet of paper passes, in consequence of which a slight motion given to the frame S will force the point of the needle N through the paper, and consequently puncture this paper at the height the needle may be at the time the frame S is moved. This motion to the frame S is produced by means of a lever, $v$, fastened to the upright axis $w$, to which the said frame S is attached, and operated by a pin, 7, fast to the flange-wheel 4. A suitable spring is arranged, acting on this lever $v$ so as to keep the frame S, and consequently the point of the needle, clear of the paper, except when operated, in the manner above described, for the purpose of puncturing the paper at the desired and fixed time.

The paper wound upon the rollers P' and P is lined off with horizontal lines and numbered from 0 to 100, representing the degrees of the specific gravity, and corresponding with the proper scale of the hydrometer. At the same time the paper is lined with perpendicular lines, representing any desired number of gallons which have passed through the machine, and corresponding with the motion and velocity the paper is made to travel.

The operation of the machine is as follows: The distilled liquid runs into the box through the pipe C, which, being placed directly over the wheel A, fills one of the chambers in said wheel until the desired fixed quantity is nearly contained therein, when, in the manner before described, the float G lifts up, lifting at the same time the lever D, with its roller E, so as to allow the wheel A to turn around until the partition of the next chamber in said wheel comes against this roller E, so as to stop the further motion of the wheel. This following chamber is then filled and the same operation repeated. This motion of the wheel A is communicated through the pinion 6 to the index-wheel J, or to any other suitable train of gearing, from which the number of revolutions of said wheel, and consequently the quantity of liquid measured, can readily be seen. By this revolution of the wheel A the friction-roller O is likewise regularly moved or turned by means of the pawl-lever R, in combination with the ratchet-wheel 5, as above described, in consequence of which the paper is regularly wound upon the roller P from off the roller P', and passes in this manner, at fixed times and at a regular speed, between the guide-plates x x.

Supposing that each chamber or cavity in the wheel A contains one gallon, a part of this quantity from each chamber, while it is emptied during the turning around of the wheel into the box V, will pass into the box K, and from there through the pipe g into the cylinder L, and, as the box K is placed higher than the top of the cylinder L, each fresh charge will displace the liquid which was before retained in the cylinder L, in consequence of which each quantity of liquid will be weighed by the hydrometer M, situated in said cylinder L, acting, consequently, on the needle N, attached to the same, in such a manner as to move said needle higher or lower in the slot in the frame S, so as to come always opposite that line running horizontally on the paper and corresponding to the exact weight or specific gravity of the liquid, when at certain fixed times the lever v will be operated so as to move the frame S, and consequently the needle, so that said needle will puncture the paper at that place and on the line which corresponds with the weight or specific gravity of the liquid which at that time may be contained in the cylinder L.

The motion of the friction-roller O, through which the motion of the paper is regulated, as well as the time when the lever v, and consequently the frame S, as well as the needle N, shall be operated, can easily be arranged by means of suitable gearing in any manner desired, so as to weigh and mark every fifth, tenth, or any other desired number of the gallons which pass through the machine.

The front of the box H may be closed with a plate of glass, whereby the operation of the machine, such as the number of gallons passing through the same and the specific gravity of the liquid, can always be readily observed and noticed.

What I claim as my invention, and desire to secure by Letters Patent, is—

1. The arrangement and construction of the wheel A, provided with chambers or cavities, in combination with the roller E and float G, operating in the manner substantially as described.

2. The arrangement of the levers D, with the roller E, in combination with the lever F and float G, and operated by set-screws b and d, in the manner and for the purpose set forth.

3. The arrangement of the paper-rollers P P' and the manner of operating the roller P by means of the friction-roller O, for the purpose substantially as set forth.

4. The manner of operating the friction-roller O from the shaft of the wheel A by means of the gearing 2 and 3, flange-wheel 4, pin 8, and pawl-lever R, when arranged and combined in the manner and for the purpose specified.

5. The box K, in combination with the pipe g and cylinder L, the hydrometer M, with the needle N at its upper end, for the purpose substantially as set forth.

6. The frame S, in combination with the needle N and the manner of operating said frame S and needle N, substantially as and for the purpose described.

7. In combination with the hydrometer M and its needle N, the endless paper wound on rollers P' and P, and lined in the manner described, and operating together substantially for the purpose specified.

8. The friction-pulley h, with its lever k, in combination with the measuring-wheel A, for the purpose set forth.

9. The combination of the measuring-wheel A with its registering device, the hydrometer M, provided with a marking-needle, N, the paper-rollers P and P', with paper lined in the manner described, the friction-rollers O and O', and the frame S, when arranged and operating together so as to mark the quantity and the weight or specific gravity of alcohol or other liquid which is made to pass through the box V, or through the machine, substantially in the manner as set forth and specified.

WILLIAM MAGROWITZ.

Witnesses:
HENRY E. ROEDER,
D. MOSHER.